Nov. 14, 1933.  W. C. DAMSEL  1,934,681
PIPE END PROTECTOR
Filed May 1, 1931

Inventor
W. C. Damsel
By Seymour & Bright
Attorneys

Patented Nov. 14, 1933

1,934,681

UNITED STATES PATENT OFFICE 1,934,681

PIPE END PROTECTOR

William C. Damsel, Glens Falls, N. Y., assignor to James Henry Hayes, New York, N. Y.

Application May 1, 1931. Serial No. 534,420

1 Claim. (Cl. 137—91)

This invention relates to improvements in pipe end protectors, and more particularly to protectors for use with pipe ends that are to be joined by couplings.

It sometimes happens in transporting pipes that, due to the weight of the superposed load, shifting of the pipes relatively to one another, rough handling, etc., that pipe ends will be scarred and mashed out of round, and if the pipe end is grooved or flanged for cooperation with a pipe coupling, such damage will unfit the pipe for use and may result in leaky joints.

Heretofore, it has been proposed to protect pipe ends by the use of metal rings which are generally of split form. Consequently, any hammering on an end of the ring will result in damage to the pipe end.

It has also been proposed to employ as a pipe end protector, a rubber ring provided with an internal metallic reinforcement, but such reinforcement not only reduces the shock absorbing characteristics of the rubber, but prevents the ready placing of the protector onto the pipe end, or the removal of the protector from the pipe end.

The primary object of the present invention is to provide a protector of some suitable shock absorbing material, such as rubber, and so shaped that it may be easily placed on or removed from the pipe end, and which, when once in place, cannot be accidentally detached. Incidentally, the exterior of the ring is of such form as to facilitate the sliding of adjacent objects on the protector without liability of such objects digging into the rubber, and in this way detaching the protector from the pipe.

With the foregoing objects outlined and with other objects in view which will appear as the description proceeds, the invention consists in the novel features hereinafter described in detail, illustrated in the accompanying drawing, and more particularly pointed out in the appended claim.

Referring to the drawing.

Figure 1:
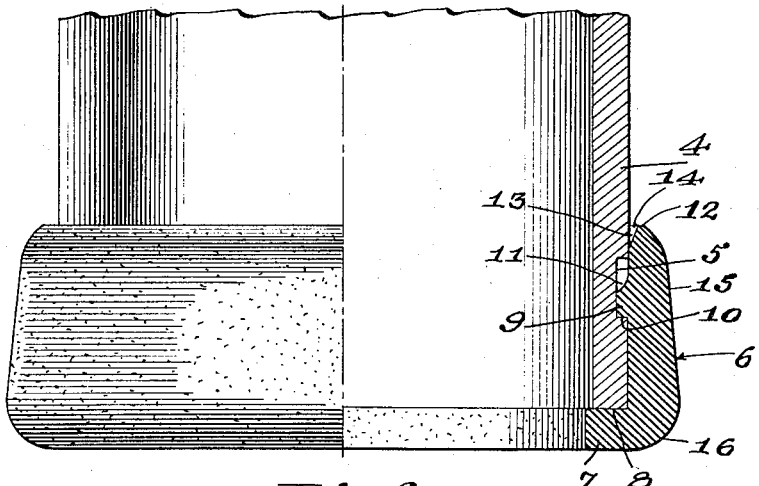
Fig. 1 is an elevation partly in longitudinal section of a grooved pipe end protected by one of the improved resilient rings.

In the embodiment of the invention illustrated in Fig. 1, 4 designates a pipe end of the type having an annular groove 5 in its periphery. For the purpose of protecting this end, it cooperates with a one-piece ring 6 of rubber or the like. One end of this ring has an inwardly extending annular flange 7 which abuts against the annular edge 8 at the end of the pipe. The interior of the ring has an integral annular medial flange 9, one edge of which is arranged perpendicular to the axis of the ring, as shown at 10, so that this edge will abut against one side of the pipe groove when the ring is placed on the pipe end and the medial flange enters said groove. The opposite edge of the medial flange is flared outwardly as shown at 11, to facilitate the placing of the ring on the pipe.

The end of the ring opposite that having the internal flange terminates in a thin annular lip 12. The inner surface of the ring flares outwardly to the edge of this lip, as shown at 13, so as to provide an annular cavity 14 into which a screw driver or the like may be inserted when it is desired to wedge the protector off the pipe end.

It will be observed that the flanged end of the ring is of larger diameter than the opposite end thereof, and that the outer surface of the ring tapers from the enlarged end toward said lip, as shown at 15. This tapered surface merges into a shorter tapered surface 16 that extends toward the flanged end of the ring, and these tapered surfaces facilitate the sliding of adjacent objects over the ring without liability of such objects accidentally detaching the ring from the pipe.

Figure 2:
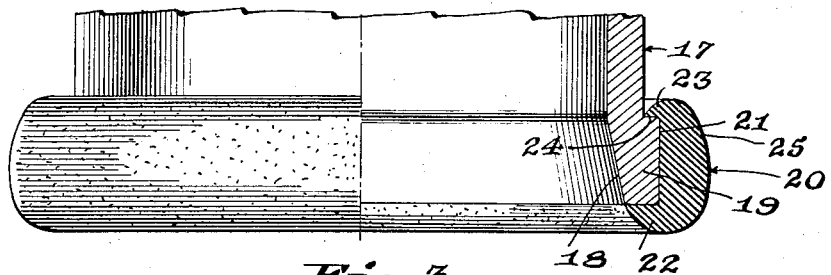
Fig. 2 is a similar view of a modification, in which a slightly different form of ring cooperates with an expanded end pipe having an external flange or bead.

In the modification shown in Fig. 2, the pipe 17 has its end expanded as shown at 18 to provide an external flange 19. The cushion protecting ring in this example is shown at 20, and it is formed of rubber or the like, and provided with an internal annular groove 21 to receive the flange 19, a relatively long annular lip 22 being provided at one end of the ring for engagement with the extremity of the pipe, and a shorter annular lip 23 being provided at the other end of the ring for engagement with the wall 24 of the flange. In this form, the ring has its external surface rounded in the direction of the axis of the ring, as shown at 25, and this shaping gives the ring sufficient thickness for shock absorbing purposes, and also forms guide surfaces on the exterior of the ring.

Figure 3:
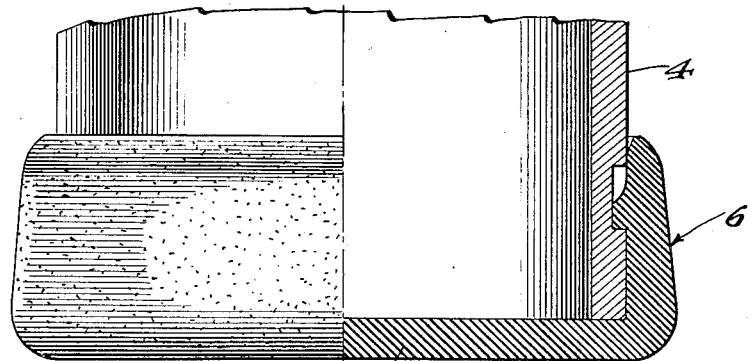
Fig. 3 is a diametrical sectional view of one of the protecting rings shown formed with a web for sealing a pipe end.

If it is desired that the ring seal the pipe end, as well as protect it, one end of the ring may be made integral with a disk-shaped web 26, as shown in Fig. 3, and such web will close the end of the pipe.

As protectors of this character may only be used a single time, it is preferred that they be made of cheap rubber stock, such as that obtained from discarded automobile tires.

It will be noted that the ring is not provided interiorly with any reinforcement which would be liable to affect its resiliency, and due to this, the ring has sufficient elasticity to be easily placed on or taken off the pipe end by a straight line motion.

The drawing discloses what are now considered to be preferred embodiments of the invention in such manner that the same may be readily understood by those skilled in the art, and it is manifest that changes may be made in the details disclosed, without departing from the spirit of the invention, as expressed in the claim.

What is claimed and desired to be secured by Letters Patent is:

The combination with a pipe end having an annular groove in its side wall, of a protecting ring of elastic material consisting of a relatively thick annular wall having means at one end thereof to abut the extremity of the pipe, an annular flange arranged at the medial portion of the wall of said ring and extending into said groove, one edge only of said flange abutting a side of said groove, the other edge of said flange being spaced from the other side of said groove, the other end portion of the wall of said ring having its inner surface flaring from the flange toward that end of the wall, and the outer surface of the wall being tapered toward the last mentioned end of the wall.

WILLIAM C. DAMSEL.